US007802303B1

(12) United States Patent
Zhao et al.

(10) Patent No.: US 7,802,303 B1
(45) Date of Patent: Sep. 21, 2010

(54) REAL-TIME IN-LINE DETECTION OF MALICIOUS CODE IN DATA STREAMS

(75) Inventors: Xiaoming Zhao, Nanjing (CN); Gang Chen, Nanjing (CN); Paul Hong, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 1118 days.

(21) Appl. No.: 11/478,705

(22) Filed: Jun. 30, 2006

(51) Int. Cl.
G08B 23/00 (2006.01)
G06F 12/14 (2006.01)

(52) U.S. Cl. .................. 726/24; 726/14; 726/25; 713/165; 713/188; 380/217; 370/230; 709/224

(58) Field of Classification Search .................. 726/13, 726/14, 22–25; 713/152, 160, 161, 165–167, 713/188; 370/230; 709/224; 348/14.13; 380/217
See application file for complete search history.

(56) References Cited

U.S. PATENT DOCUMENTS

| | | | |
|---|---|---|---|
| 5,623,600 A | | 4/1997 | Ji et al. |
| 5,951,698 A | * | 9/1999 | Chen et al. ............... 714/38 |
| 6,449,658 B1 | * | 9/2002 | Lafe et al. ............... 709/247 |
| 6,615,166 B1 | * | 9/2003 | Guheen et al. .......... 703/27 |
| 7,107,617 B2 | * | 9/2006 | Hursey et al. .......... 726/22 |
| 7,363,655 B2 | * | 4/2008 | Franczek et al. ....... 726/22 |
| 7,409,714 B2 | * | 8/2008 | Gupta et al. ............ 726/23 |
| 7,454,418 B1 | * | 11/2008 | Wang ...................... 1/1 |
| 2003/0014662 A1 | * | 1/2003 | Gupta et al. ........... 713/200 |

OTHER PUBLICATIONS

InterScan Web Security Suite, 2 pgs; Trend Micro Incorporated, Webpage [online][retrieved on Jun. 13, 2006]; Retrieved from the Internet: http://www.trendmicro.com/en/products/gateway/iwss/evaluate/overview.htm.

Network VirusWall 300, 2pgs; Trend Micro Incorporated, Webpage [online][retrieved on Jun. 13, 2006]; Retrieved from the Internet: http://www.trendmicro.com/en/products/network/nvw300/evaluate/overview.htm.

InterScan VirusWall, 2 pgs; Trend Micro Incorporated, Webpage [online][retrieved on Jun. 13, 2006]; Retrieved from the Internet: http://www.trendmicro.com/en/products/gateway/isvw/evaluate/overview.htm.

Trend Micro™ White Paper Network VirusWall 300, "An Outbreak Prevention Appliance Deployed at Network End Points to Protect Mission-Critical Devices such as ATMs from Network Worms" Jun. 2005, pp. 1-14, Trend Micro Incorporated, Cupertino, California.

(Continued)

*Primary Examiner*—Benjamin E Lanier
*Assistant Examiner*—Hadi Armouche
(74) *Attorney, Agent, or Firm*—Okamoto & Benedicto LLP (57) ABSTRACT

In one embodiment, a data stream is scanned for presence of computer viruses using a stream-based protocol parser, a stream-based decoder/decompressor, and a stream-based pattern matching engine. The protocol parser may be configured to extract application layer content from the data stream to generate a file stream. The protocol parser may stream the file stream to the decoder/decompressor, which may decode/decompress the file stream to generate a plain stream. The decoder/decompressor may stream the plain stream to the pattern matching engine, which in turn may scan the plain stream for viruses. Advantageously, the aforementioned components may perform its function as soon as streaming data becomes available, without having to wait for the entirety of the data.

10 Claims, 9 Drawing Sheets

OTHER PUBLICATIONS

John W. Lockwood, et al. "Application of Hardware Accelerated Extensible Network Nodes for Internet Worm and Virus Protection", Dec. 2003, 13 pages, International Working Conference on Active Networks (IWAN), [retrieved on Jun. 13, 2006]; Retrieved from the internet: http://www.arl.wustl.edu/projects/fpx/references/index.html.

Michael Attig, et al. "A Framework for Rule Processing in Reconfigurable Network Systems", Apr. 2005, 10 pages, IEEE Proceedings Symposium on Field-Programmable Custom Computing Machines (FCCM), [retrieved on Jun. 13, 2006]; Retrieved from the internet: http://www.arl.wustl.edu/projects/fpx/refernces/index.html.

Bloom Filters—the math, pp. 1-7; Datasheet [online][retrieved on Jun. 14, 2006]; Retrieved from the internet: http://www.cs.wisc.edu/cao/papers/summary-cache/node8.html.

\* cited by examiner

REAL-TIME IN-LINE DETECTION OF MALICIOUS CODE IN DATA STREAMS

BACKGROUND OF THE INVENTION

1. Field of the Invention

The present invention relates generally to data processing, and more particularly but not exclusively to detection of computer viruses.

2. Description of the Background Art

Computer viruses, worms, Trojans, and spyware are examples of malicious codes that have plagued computer systems throughout the world. Although there are technical differences between each type of malicious code, malicious codes are collectively referred to as "viruses." For example, commercially available "antivirus software" is designed to scan a computer for viruses as well as worms and other malicious codes.

Traditional antivirus techniques are file-based that require random access of object files. Although very effective in purely file access environments, the random access nature of these file-based techniques makes them relatively difficult to apply to stream-based data. A file-based antivirus needs to buffer a file before it can scan the file for viruses. Depending on implementation details, this may lead to relatively low throughput and large memory requirement. Unfortunately, with the advent of the Internet, detection and blocking of viruses embedded in network data streams have become very important. Packet level scanning solutions that monitor packet level behavior rather than virus bodies encoded and encapsulated in data streams may not be effective enough to deal with the latest threats. Packet level scanning solutions that rely exclusively on special-purpose hardware for scanning may not be flexible enough for low end applications and may not be able to handle compressed data.

SUMMARY

In one embodiment, a data stream is scanned for presence of computer viruses using a stream-based protocol parser, a stream-based decoder/decompressor, and a stream-based pattern matching engine. The protocol parser may be configured to extract application layer content from the data stream to generate a file stream. The protocol parser may stream the file stream to the decoder/decompressor, which may decode/decompress the file stream to generate a plain stream. The decoder/decompressor may stream the plain stream to the pattern matching engine, which in turn may scan the plain stream for viruses. Advantageously, the aforementioned components may perform its function as soon as streaming data becomes available, without having to wait for the entirety of the data.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
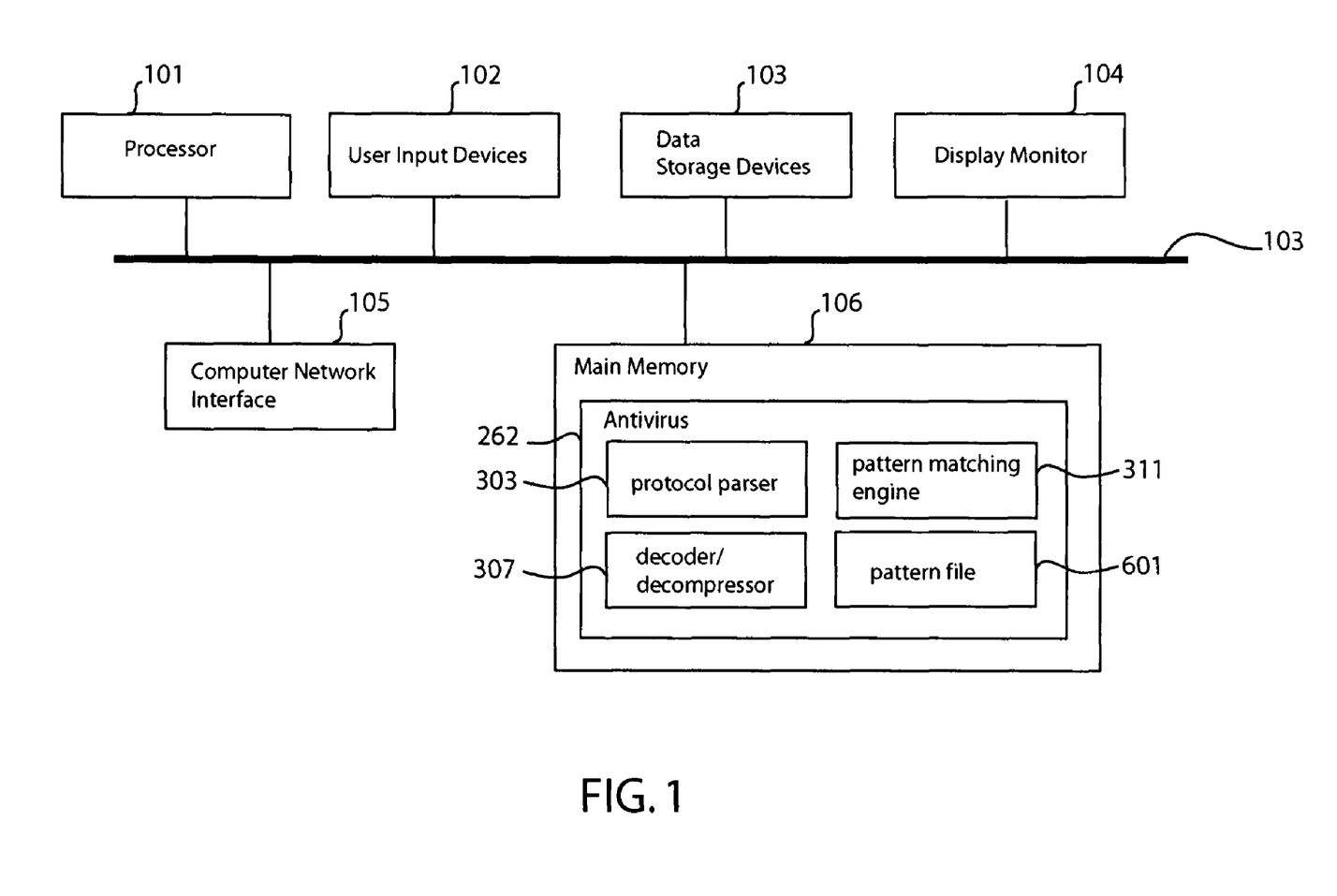
FIG. 1 shows a schematic diagram of a computer in accordance with an embodiment of the present invention.

Referring now to FIG. 1, there is shown a schematic diagram of a computer in accordance with an embodiment of the present invention. The computer shown in FIG. 1 may be employed as a gateway, for example. The computer of FIG. 1 may have less or more components to meet the needs of a particular application. As shown in FIG. 1, the computer may include a processor 101, such as those from the Intel Corporation or Advanced Micro Devices, for example. The computer may have one or more buses 103 coupling its various components. The computer may include one or more user input devices 102 (e.g., keyboard, mouse), one or more data storage devices 103 (e.g., hard drive, optical disk, USB memory, floppy disk), a display monitor 104 (e.g., LCD, flat panel monitor, CRT), a computer network interface 105 (e.g., network adapter, modem), and a main memory 106 (e.g., RAM). In the example of FIG. 1, the main memory 106 includes an antivirus 262. In one embodiment, the antivirus 262 comprises computer program code for detecting viruses in data streams, such as network traffic received by way of the computer network interface 105. In the example of FIG. 1, the antivirus 262 comprises a stream-based protocol parser 303, a stream-based decoder/decompressor 307, a stream-based pattern matching engine 311, and a pattern file 601. The antivirus 262 may be executed by the processor 101.

Figure 2:
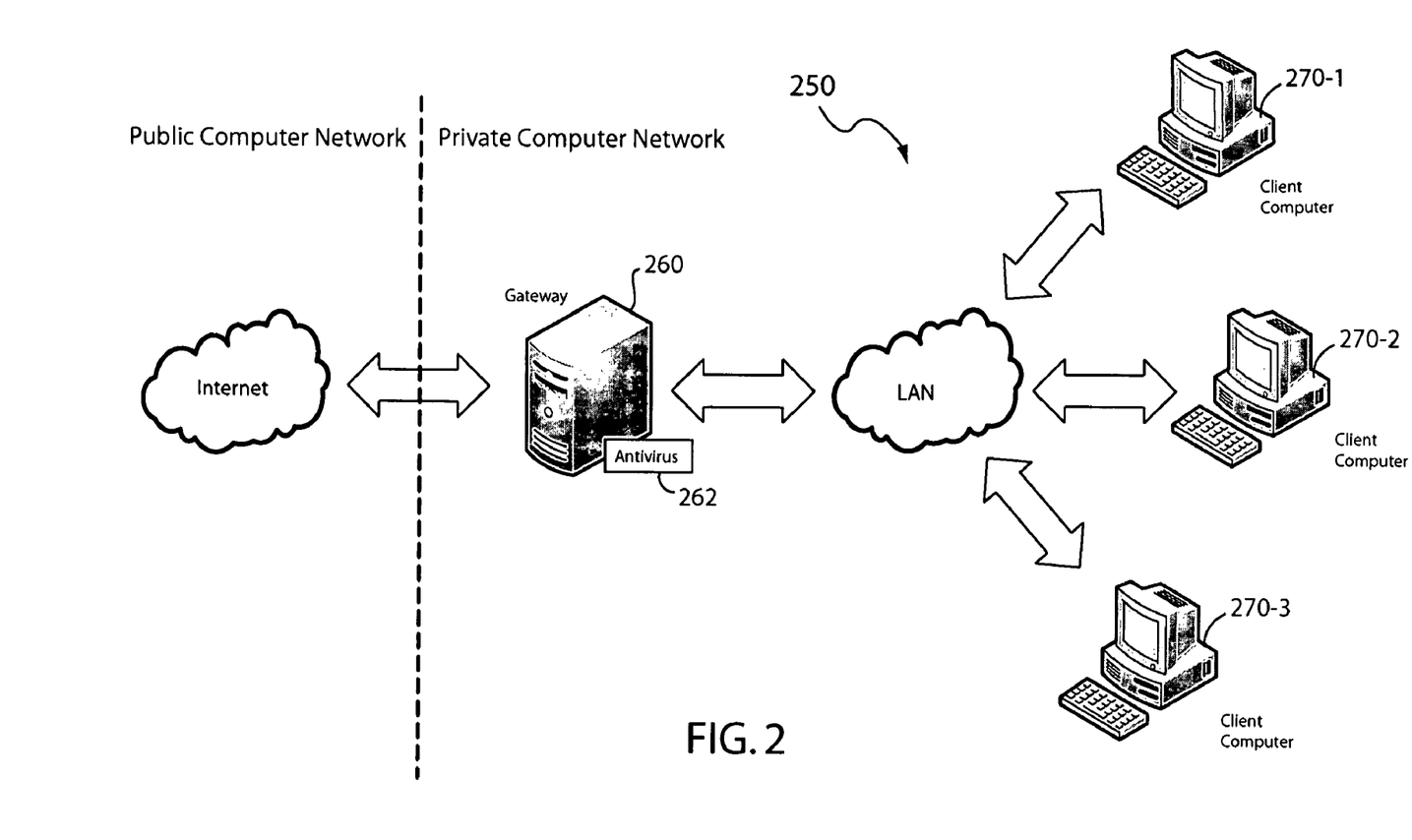
FIG. 2 schematically shows a computing environment where the computer of FIG. 1 may be employed, in accordance with an embodiment of the present invention.

FIG. 2 schematically shows a computing environment where the computer of FIG. 1 may be employed, in accordance with an embodiment of the present invention. In the example of FIG. 2, the computer of FIG. 1 is deployed as a gateway 260 in a private computer network 250. The gateway 260 is configured to scan network traffic flowing between the public computer network (e.g., Internet) and the private computer network 250. The gateway 260 may comprise, the antivirus 262 running in a server computer, such as those commercially available from International Business Machines (IBM) or Sun Microsystems, for example. The private computer network 250 may include a plurality of client computers 270 (i.e., 270-1, 270-2, . . . ) communicating with computers on the Internet by way of the gateway 260. Computers on the private computer network 250 may communicate with each other over a local area network (LAN). Computers on the Internet and intermediate nodes, such as routers and various servers, are not shown in FIG. 2 for clarity of illustration.

Figure 3:
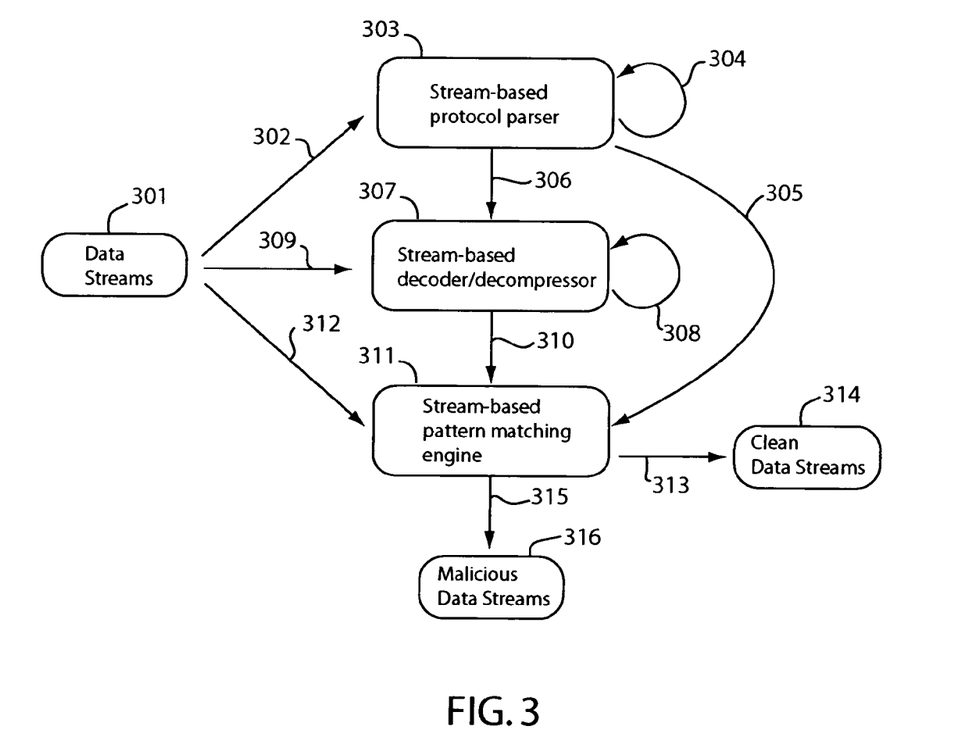
FIG. 3 shows a flow diagram of an antivirus in accordance with an embodiment of the present invention.

FIG. 3 shows a flow diagram of the antivirus 262 in accordance with an embodiment of the present invention. In the example of FIG. 3, the stream-based protocol parser 303, the stream-based decoder/decompressor 307, and the stream-based pattern matching engine 311 are implemented in software. All, one, or some of these components of the antivirus 262 may also be implemented in hardware or a combination of hardware and software (firmware) without detracting from the merits of the present invention. The aforementioned components of the antivirus 262 are "stream-based" in that they are configured to operate on a file (or other data unit) in a sequential manner (e.g., from first received bytes to later received bytes) even when the entirety of the file has not been received in the component. This is in contrast to traditional random access of different portions of the file for processing.

In the example of FIG. 3, the data streams 301 may comprise communication protocol streams, file streams, and plain streams. The data streams 301 may comprise network traffic flowing between the private computer network 250 and the Internet in the example of FIG. 2.

A protocol stream may comprise data exchanged between communicating computers, the data representing information defined by a communication protocol. For example, Hyper Text Transfer Protocol (HTTP) data exchanged between a client and a server comprise an HTTP stream. Files may be extracted from application layer protocol streams. For example, a file may be extracted from a payload in an HTTP stream. In the Open Systems Interconnection (OSI) seven layer model, a protocol stream may contain upper layer protocol streams. For example, HTTP streams (layer 7 protocol in the OSI model) may be extracted from Transmission Control Protocol (TCP) streams (layer 4 protocol in the OSI model).

File streams may comprise data transferring file contents from one computer to another. File streams may contain encoded or compressed contents. File streams may be extracted from protocol streams.

Plain streams may comprise file streams that do not need to be decoded or decompressed to be scanned for viruses.

In one embodiment, the stream-based protocol parser 303 comprises computer program code for extracting file streams from protocol streams or upper layer protocol streams from lower layer protocol streams. The protocol parser 303 may intercept, capture, and parse protocol packets and extract payloads from the protocol packets for virus scanning. For example, the protocol parser 303 may comprise an HTTP parser that receives network traffic as data streams and extracts application layer payloads from the data streams. The protocol parser 303 may also support other protocols at other layers without detracting from the merits of the present invention.

In one embodiment, the protocol parser 303 is implemented using a state machine. Because embodiments of the present invention may be used for transparent anti-virus filtering at different network layers, e.g. layers 2, 3, and 7, the state machine preferably traces the states of both communicating computers instead of just one of them. In general, Internet protocols and upper layer protocols, e.g. TCP, HTTP, FTP, IRC, IM protocols, etc., are preferably parsed using a stream-based algorithm to extract payload data or file and at the same time stream scanned for virus scanning. Even for random accessing protocols, such as CIFS and NFS, a stream-based algorithm is feasible as long as the client is accessing a complete file serially.

In operation, the protocol parser 303 receives protocol streams from the data streams 301 (line 302). The protocol parser 303 identifies and sequentially extracts file streams from the data streams 301, and forwards the extracted file streams to the stream-based decoder/decompressor 307 (line 306) if the file stream carries an encoded or compressed file. If the file carried by the file stream is not encoded or compressed (i.e., a plain stream), the protocol parser 303 forwards the file stream directly to the stream-based pattern matching engine 311 (305). The protocol parser 303 may process a data stream several times (line 304) to extract file streams from the various layers of the communication protocol. For improved performance, the protocol parser 303 forwards the file stream as portions of it are extracted rather than waiting for the entirety of the file to be extracted.

In one embodiment, the stream-based decoder/decompressor 307 comprises program code for decoding/decompressing encoded/compressed files. In the example of FIG. 3, the decoder/decompressor 307 sequentially decodes/decompresses files carried by file streams as received from the protocol parser 303 (line 306). The decoder/decompressor 307 may identify an encoded/compressed content (e.g., a file) in the file stream, extract the encoded/compressed content, decode/decompress the content into a plain stream, and then send the plain stream to the stream-based pattern matching engine 311 for virus scanning (line 310). The decoder/decompressor 307 may process the file stream several times (line 308) to extract nested encoded or archived files. Advantageously, for improved performance, the decoder/decompressor 307 performs its function without waiting for the entirety of the file to be received. That is, the decoder/decompressor 307 may start processing received portions of the plain stream even when other portions of the plain stream have not been received from or are still being extracted by the protocol parser 303. As shown in FIG. 3, the decoder/decompressor 307 may also directly receive file streams carrying encoded/compressed files (line 309).

In one embodiment, the stream-based pattern matching engine 311 comprises computer program code for sequentially scanning a data unit, such as a file, for viruses. The pattern matching engine 311 may receive a plain stream from the protocol parser 303 (line 305), the decoder/decompressor 307 (line 310), or directly from the data streams 301 (line 312). The pattern matching engine 311 may scan the plain stream for viruses by comparing the contents of the plain stream to virus patterns in the pattern file 601 (see FIG. 1). The pattern matching engine 311 may start scanning received portions of the plain stream without waiting for the entirety of the file carried by the plain stream. That is, the pattern matching engine 311 may begin scanning the plain stream even when other portions of the plain stream are yet to be received from or are still being processed by the decoder/decompressor 307. The pattern matching engine 311 may deem the data stream 301 from which the plain stream was extracted as a malicious data stream 316 if it contains a virus (line 315) or as clean data stream 314 if it does not contain a virus (line 313). The pattern matching engine 311 (or another module of the antivirus 262) may perform predetermined actions depending on whether the data stream 301 is virus-infected or virus-free. For example, a virus-free data stream 301 may be allowed to pass through the gateway 260 (see FIG. 2), while an infected data stream 301 may be blocked by the gateway 260.

Figure 4:
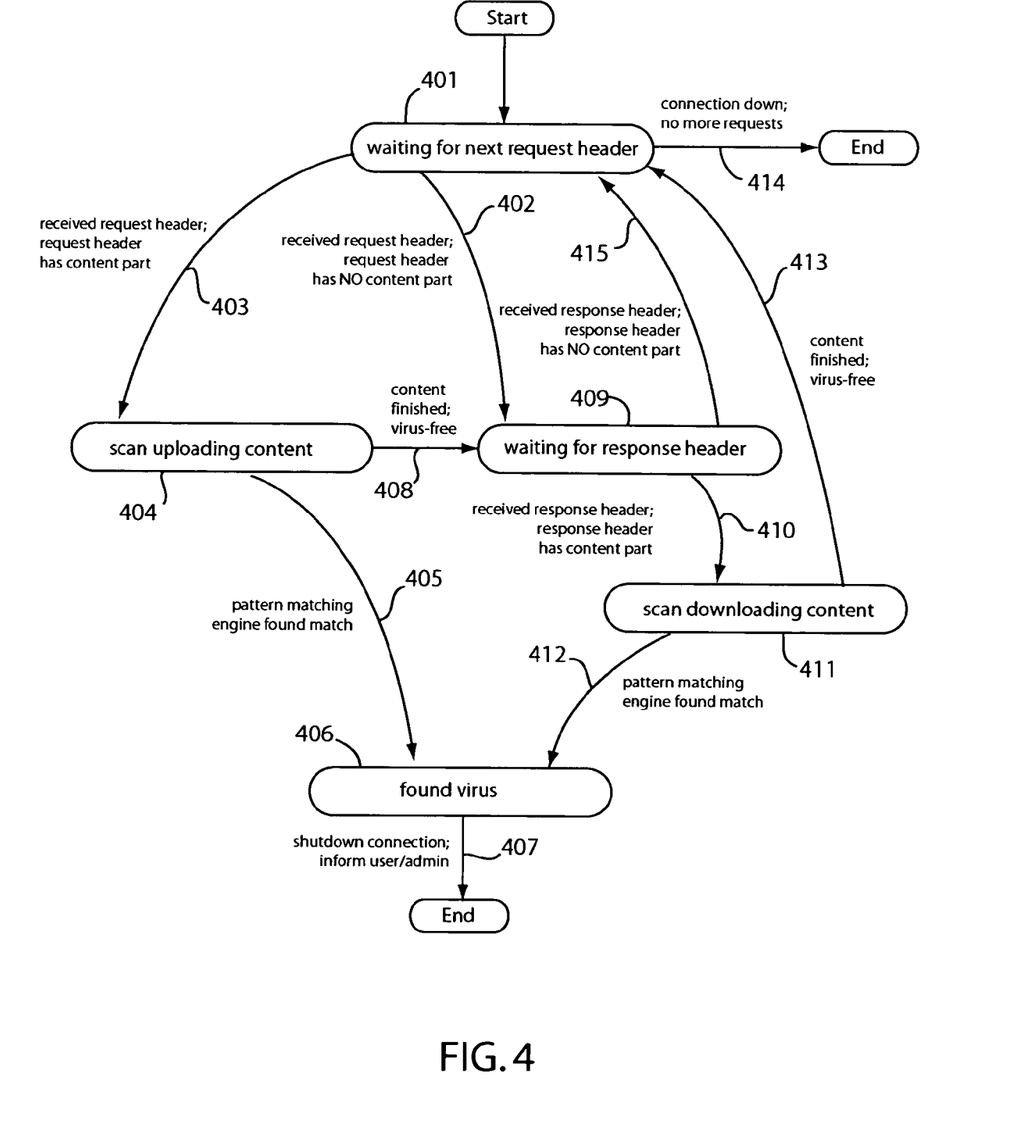
FIG. 4 shows a state diagram illustrating the operation of a stream-based protocol parser in accordance with an embodiment of the present invention.

FIG. 4 shows a state diagram illustrating the operation of a stream-based protocol parser 303 in accordance with an embodiment of the present invention. In the example of FIG. 4, the protocol parser 303 comprises an HTTP parser. Parsers for other protocols may also be used without detracting from the merits of the present invention.

In state 401, the protocol parser 303 waits for an HTTP request header, which may be from a client computer 270 of the private computer network 250 (FIG. 2). The request header may be sent by the client computer 270 to a web site on the Internet to request a web page, for example. The state machine changes from state 401 to state 409 when the protocol parser 303 receives a request header that has no content (e.g., a file) part (line 402). In state 409, the protocol parser 303 waits for an HTTP response header. In the web site example, the HTTP response header may be from the web site responding to the request by the client computer 270. If a received response header includes a content part (line 410), the protocol parser 303 forwards the content directly or indirectly (e.g., by way of the decoder/decompressor 307; see FIG. 3), depending on whether or not the content is encoded/compressed, to the pattern matching engine 311 for virus scanning as indicated in state 411. Otherwise, if the response header has no content part (line 415), the state machine changes from state 409 to state 401 and waits for another request header.

The state machine changes from state 411 to state 401 after the pattern matching engine 311 completes the scanning of the content and finds the content to be virus-free (line 413). The state machine exits when the connection goes down or there are no more HTTP requests (line 414).

The state machine changes from state 401 to state 404 when the protocol parser 303 receives a request header that has a content part (line 403). In that case, the protocol parser 303 forwards the content directly or indirectly (e.g., by way of the decoder/decompressor 307; see FIG. 3), depending on whether or not the content is encoded/compressed, to the pattern matching engine 311 for virus scanning as indicated in state 404. If the content is virus-free (line 408), the state machine changes from state 404 to state 409 and waits for a response header.

From state 404 or 411, the state machine changes to state 406 if the pattern matching engine 311 detects a virus in the content part of the request header (line 405) or in the content part of the response header (line 412). The pattern matching engine 311 or another component of the antivirus 262 may initiate shutdown of the HTTP connection (line 407) upon detection of a virus. The user or the network administrator may also be informed of the presence of one or more viruses in the HTTP connection.

A protocol parsing state machine, such as the one in FIG. 4, typically remembers states rather than historical data, resulting in relatively low memory cost for protocol streams. However, this may not be true for protocols that allow unordered data arrival. Fortunately, TCP is the only widely-used protocol that has unordered data arrival. Even so, a state machine that performs TCP parsing may not need a relatively large memory for two reasons. First, unordered arrival of TCP packets is caused by multiple routing paths, certain queuing strategies of routers, and so forth. Therefore, unordered arrival of TCP packets should not occur too often to be problematic. Second, since there are receiving windows that constrain both network traffic directions, only unordered data within the receiving window needs to be buffered. From a statistical point of view, the average buffer size needed by TCP streams for storing unordered data should be less than the average size of the receiving window. Thus, it is estimated that the size of a TCP receiving window should be no more than 64 KB in most platforms.

Figure 5A:
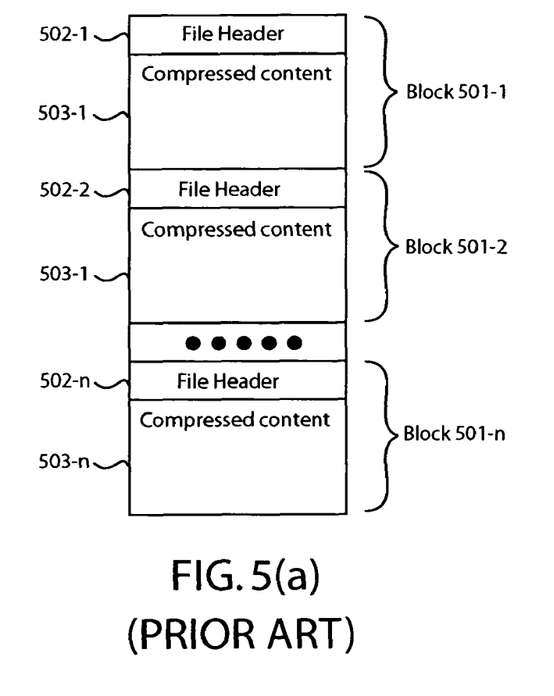
FIG. 5(a) schematically shows the format of a conventional compressed archive file.

Turning now to FIG. 5(a), there is schematically shown the format of a conventional compressed archive file, such as ZIP and RAR archive files. In the example of FIG. 5(a), the archive file includes a plurality of blocks 501 (i.e., 501-1, 501-2, . . . ), each of which includes a file header 502 (i.e., 502-1, 502-2, . . . ) and a corresponding content 503 (i.e., 503-1, 503-2, . . . ). A compressed content 503 is typically a compressed file. An archive file with n compressed files would thus typically have n blocks 501.

Figure 5B:
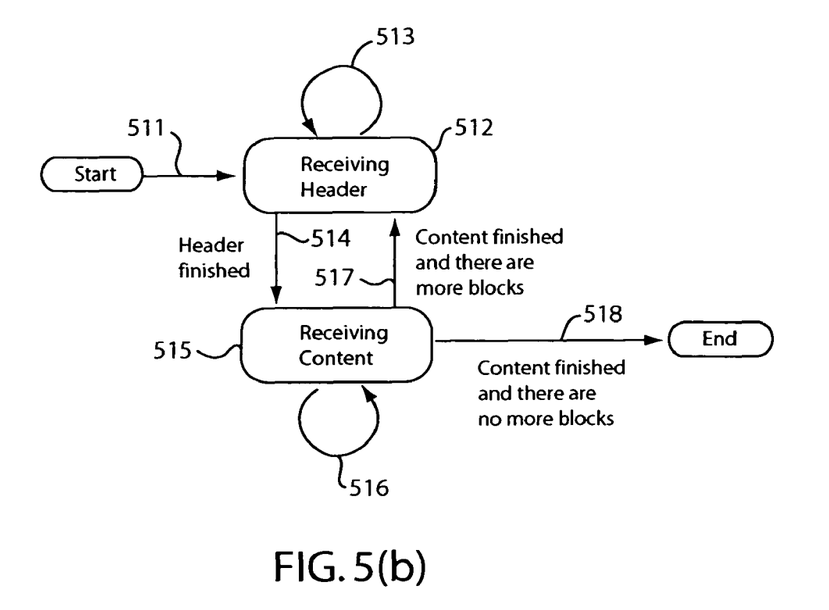
FIG. 5(b) shows a state diagram illustrating the operation of a stream-based decoder/decompressor, in accordance with an embodiment of the present invention.

FIG. 5(b) shows a state diagram illustrating the operation of a stream-based decoder/decompressor 307, in accordance with an embodiment of the present invention. In the example of FIG. 5(b), the decoder/decompressor 307 sequentially decompresses archived files, such those having the format shown in FIG. 5(a). The decoder/decompressor 307 may have several state machines, one for each compressed file format. The decoder/decompressor 307 may examine a header of a compressed file carried by a file stream, determine the compression format of the file, and decompress the compressed file in accordance with its format.

In the example of FIG. 5(b), the decoder/decompressor 307 receives a file stream (line 511) directly from network traffic (line 309 in FIG. 3) or from the protocol parser 303 (line 306 in FIG. 3). In state 512, the decoder/decompressor 307 receives a header 502 of the compressed archive file. The decoder/decompressor 307 continues to receive the header 502 (line 513) until it completes receiving the entirety of the header (line 514). At that time, in state 515, the decoder/decompressor 307 starts receiving a content 503 associated with the header 502. Without waiting for the entirety of the content 503, the decoder/decompressor 307 begins decompressing the content 503 as it is serially received (line 516). For example, the decoder/decompressor 307 may initiate decompression of the content 503 as portions of the content 503 become available to the decoder/decompressor 307, even when it has not received the entirety of the content 503 from the protocol parser 303.

The decoder/decompressor 307 may stream the decompressed portions of the content 503 to the pattern matching engine 311 (line 315 in FIG. 3) as the decompressed portions become available. That is, the decoder/decompressor 307 does not have to wait to decompress the entirety of the content 503 before providing the content 503 to the pattern matching engine 311. If the entirety of the content 503 has been decompressed and the archive file has more blocks 501 (line 517), the decoder/decompressor 307 receives the header of the next block 501 in state 512 and repeats the process. The state machine ends otherwise (line 518).

Stream-based decompression using a state machine takes advantage of the fact that popular compression formats employ a one-pass algorithm. This allows a state machine like that in FIG. 5(b) to be employed for file streams with compressed contents. A stream-based state machine for decompression also does not require large amounts of memory. For example, ZIP archives with normal compression settings typically do not need more than 40 Kbytes of memory to remember decompression states. This 40 Kbytes of memory is almost the whole memory cost for a ZIP file stream; a larger buffer may not be needed regardless of the size of the archive.

Some message formats, such as MIME Base64 and UUEncode, utilize text-based encoding. To detect in-line detection of viruses embedded in such encoded messages, a decompression-like state machine-based approach may also be used. Memory cost will also be relatively small. For example, it is estimated that a state machine will use no more than 1 Kbytes of memory for each MIME Base64 encoded stream. By using a stream-based decoding or decompression process, recursively encoded or compressed files may be supported automatically by concatenate multiple decoding/decompression state machines.

Figure 6:
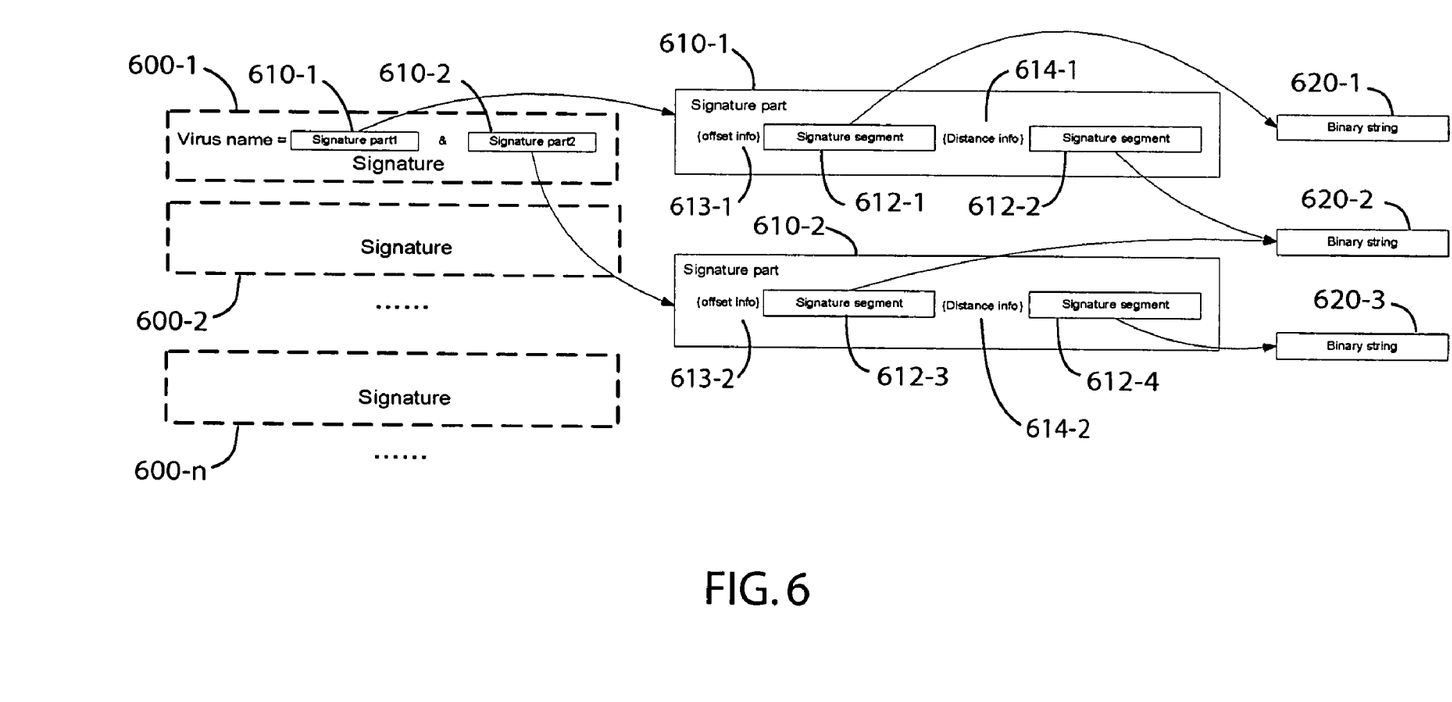
FIG. 6 schematically shows computer virus signatures in accordance with an embodiment of the present invention.

Referring now to FIG. 6, there is schematically shown computer virus signatures 600 (i.e., 600-1, 600-2, . . . ) in accordance with an embodiment of the present invention. The virus signatures 600 may be included in a pattern file 601 (see FIG. 1) that the pattern matching engine 311 may consult to identify viruses in data streams. A pattern file 601 may have a plurality of virus signatures 600, one for each particular virus. In the example of FIG. 6, a virus signature 600 may have a virus name and one or more signature parts 610 (i.e., 610-1, 610-2, . . . ). The signature parts 610 may comprise binary strings (e.g., byte strings) indicative of a presence of a virus. Depending on implementation, a data stream with all (logical AND) or some (logical OR) of the signature parts 610 of virus signature parts 610 of a virus signature 600 may be deemed to be infected with a virus.

In one embodiment, a signature part 610 includes an offset information 613 (i.e., 613-1, 613-2, . . . ), a signature segment 612 (i.e., 612-1, 612-2, . . . ), and a distance information 614 (i.e., 614-1, 614-2, . . . ). A signature segment 612 may be a binary string indicative of a presence of a virus. A signature part 610 may have more one or more signature segments 612.

Offset information 613 specifies an offset to a location in a data stream where a signature segment 612 should be found. The offset information 613 may be relative to a byte in the data stream, for example. Offset information 613 is optional. When not present in a virus signature part 610, it means the corresponding signature segment 612 may be found at any number of bytes from a reference position in the data stream. Otherwise, the signature segment 612 must occur at an offset indicated by the offset information 613.

It is also optional to have distance information 614 or to have more than one signature segment 612 in a signature part 610. When there are two or more signature segments 612 in a signature part 610, distance information 614 indicates the distance (e.g., in bytes) between two signature segments 612 in the data stream. When two signature segments 612 occur in the data stream but are not separated by a distance corresponding to the distance information 614, the signature segments 612 do not satisfy the conditions of the virus signature. In one embodiment, the distance information 614 is in the form "{min-max}" where "min" indicates the minimum separation between signature segments 612 and "max" indicates the maximum separation between signature segments 612. For example, {0-10} may indicate that there may be zero to ten bytes separating the signature segments 612 in the data stream. As another example, and depending on implementation, {0-0} may indicate that there is no limit on the number of bytes separating two signature segments 612.

In one embodiment, each signature segment 612 comprises a binary string, such as a fixed byte string 620 (i.e., 620-1, 620-2, . . . ). Depending on implementation, a signature segment 612 may also comprise a variable length byte string. A byte string 620 may be 12 to about 256 bytes in length, for example. In one embodiment, each byte string 620 is a unique byte string. In FIG. 6, the byte string 620-2 is the signature segment 612-2 of the signature part 610-1 and the signature segment 612-3 of the signature part 610-2; the byte string 620-1 is the signature segment 612-1 of the signature part 610-1; and the byte string 620-3 is the signature segment 612-4 of the signature part 610-2. To scan a data stream for viruses, the pattern matching engine 311 may look for byte strings 620-1, 620-2, 620-3, etc. in the data stream.

Other suitable virus signature formats may also be used without detracting from the merits of the present invention.

Figure 7:
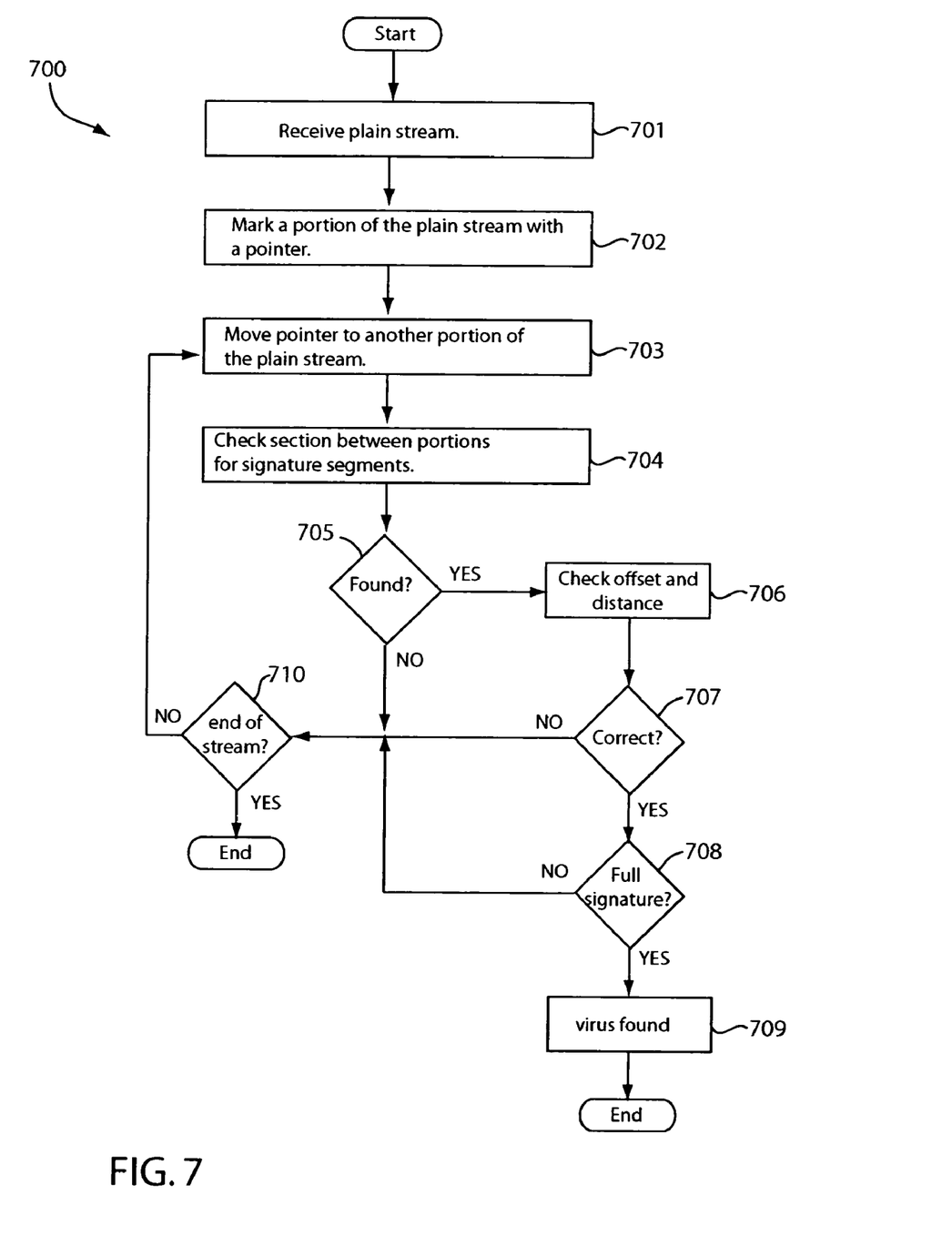
FIG. 7 shows a flow diagram of a method of checking a data stream for viruses in accordance with an embodiment of the present invention.

FIG. 7 shows a flow diagram of a method 700 of checking a data stream for viruses in accordance with an embodiment of the present invention. Method 700 may be performed by the pattern matching engine 311 using a pattern file 601 containing virus signatures 600, for example.

In step 701, the pattern matching engine 311 receives a plain stream from the decoder/decompressor 307 (line 310 in FIG. 3) or the protocol parser 303 (line 305 in FIG. 3). In step 702, the pattern matching engine 311 marks a portion (e.g., a byte, a binary bit, etc.) of the plain stream with a pointer. This portion may be the first received byte of the plain stream and may be used as a reference for offsets, if any. In step 703, the pattern matching engine 311 moves the pointer to another portion of the plain stream. This other portion may be towards later received bytes of the plain stream. In steps 704 and 705, the pattern matching engine 311 checks the section between the portions of the plain stream for signature segments 612. In one embodiment, the pattern matching engine 311 moves the pointer one byte at a time, checking for matching signature segments 612 each time.

In steps 706 and 707, if a signature segment 612 occurs in the plain stream, the pattern matching engine 311 checks the location of the signature segment 612 in the plain stream against associated offset information 613 and distance information 614, if any. In step 708, if the signature segment 612 occurs in the correct location in the plain stream, the pattern matching engine 311 determines whether all conditions (e.g., signature parts and logical relationship between signature parts) of a virus signature 600 that includes a signature part 610 that in turn includes the found signature segment 612 are now satisfied. If so, in step 709, the pattern matching engine 311 deems that a virus is found in the plain stream.

In step 710, if no signature segment 612 is found between the portions of the plain stream or if a found signature segment 612 is not in the correct location in the plain stream or if the conditions of a virus signature 600 are not fully satisfied, the pattern matching engine 311 determines whether the plain stream is still streaming. If so, the pattern matching engine moves the pointer to another portion (e.g., next byte) of the plain stream for another round of virus scanning. Otherwise, the virus scanning process ends.

FIGS. 8(a)-8(d) further illustrate the method 700. In the example of FIGS. 8(a)-8(d), the pattern matching engine 311 uses a pattern file 601 that includes the following virus signatures:

TABLE 1 vir1 = {8}0102030405060708090a0b0c{10-10}
1112131415161718191a1b1c
vir2 = 0102030405060708090a0b0c{0-0}
2122232425262728292a2b2c The first virus signature of Table 1 has a single signature part with the following specifications:
 a) name of the virus=vir1;
 b) offset information=8;
 c) first signature segment="0102030405060708090a0b0c";
 d) second signature segment="1112131415161718191a1b1c";
 e) distance information between first and second signature segments={10-10} or exactly 10 bytes.

The second virus signature of Table 1 has single signature part with the following specifications:
 a) name of the virus=vir2;
 b) offset information=none;

c) first signature segment="0102030405060708090a0b0c";
d) second signature segment="2122232425262728292a2b2c";
e) distance information between first and second signature segments={0-0} (i.e., can be any distance).

Note that there are three unique byte strings between the signature segments of viruses vir1 and vir2. These byte strings are labeled as "ID=1", "ID=2", and "ID=3" in Table 2. Byte string ID=1 is a signature segment common to both viruses vir1 and vir2, byte string ID=2 is a signature segment of the virus vir2, and byte string ID=3 is a signature segment of the virus vir2.

TABLE 2

0102030405060708090a0b0c (ID = 1)
1112131415161718191a1b1c (ID = 2)
2122232425262728292a2b2c (ID = 3)

Figure 8A:
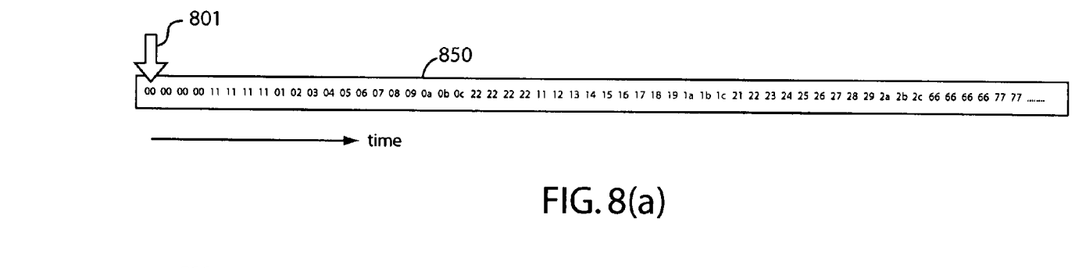
FIGS. 8(a)-8(d) further illustrate the method of FIG. 7.
Figure 8B:
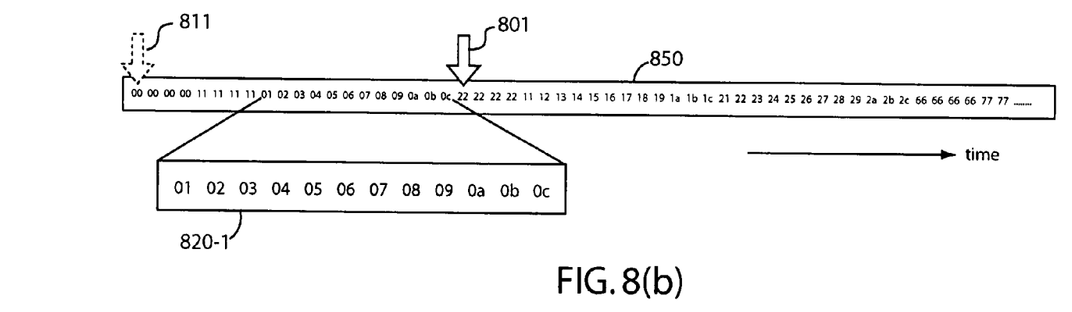

Turning now to FIG. 8(a), the pattern matching engine 311 is in the process of receiving a plain stream 850. In FIG. 8(a), the byte "00" pointed by the pointer 801 is the first received byte of the plain stream 850. In FIG. 8(b), the pointer 801 is moved to another byte of the plain stream 850. The position where the pointer 801 initially was is now labeled as "811" for simplicity of illustration. In FIG. 8(b), the byte string ID=1 is found in the plain string 850 between position 811 and the pointer 801 (see window 820-1), at an offset of 8 bytes from position 811.

Figure 8C:
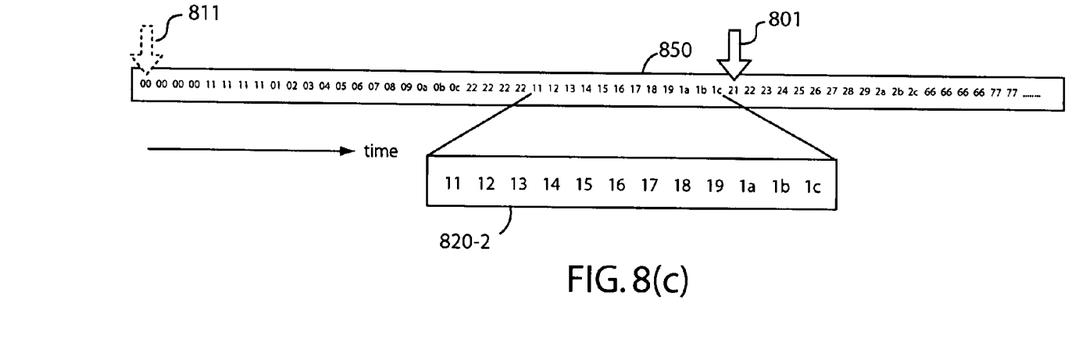

In FIG. 8(c), the pointer 801 is moved to another byte in the plain string 850, towards the later received bytes. Between position 811 and the new position of the pointer 801, the byte string ID=2 is found at an offset of 24 bytes from position 811 (see window 820-2). At this time, both signature segments (byte strings ID=1 and ID=2) of the only signature part of the signature for virus vir1 have been found. However, the conditions of the signature for virus vir1 are not satisfied because the found signature segments are not spaced 10 bytes apart (distance information for virus vir1). So the virus vir1 is deemed not found in the plain string 850 at this time.

Figure 8D:
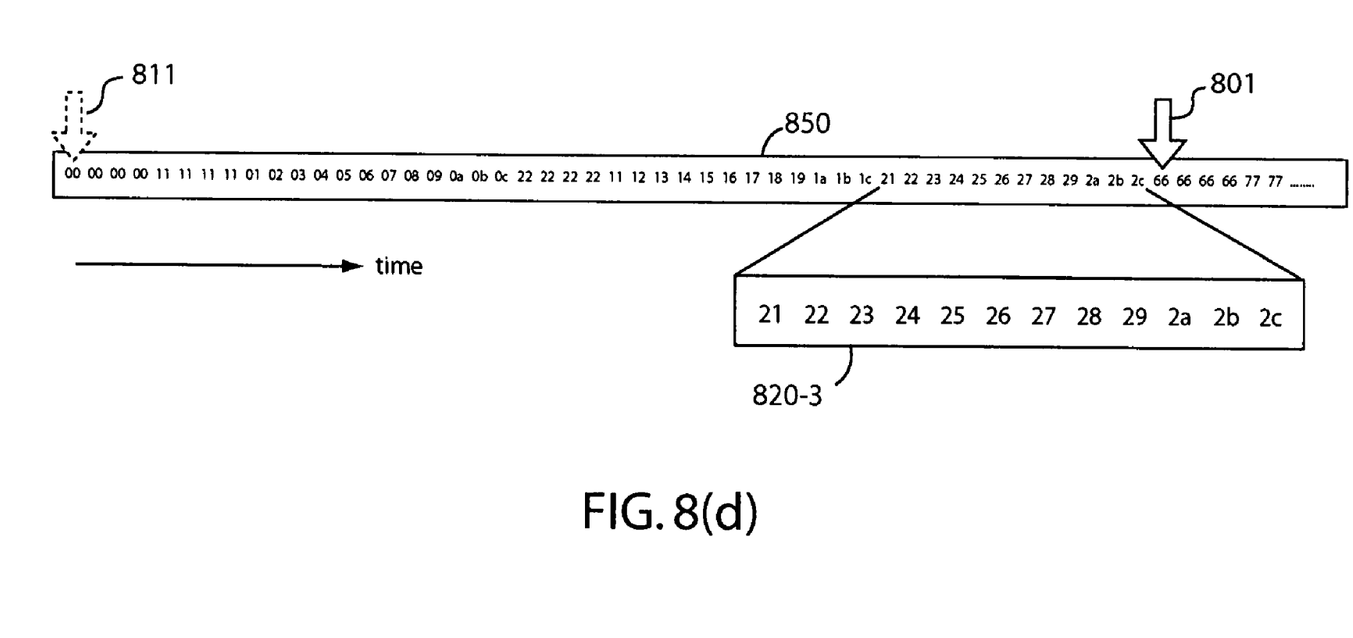

In FIG. 8(d), the pointer 801 is moved to another byte in the plain string 850, towards the later received bytes. Between position 811 and the new position of the pointer 801, the byte string ID=3 is found at an offset of 36 bytes from position 811. At this time, both signature segments (byte strings ID=2 and ID=3) of the only signature part of the signature for virus vir2 have been found. Because the signature for virus vir2 does not have any offset information and does not have a restriction on the distance between its two signature parts, the conditions for the virus vir2 are all satisfied; virus vir2 is deemed found in the plain string 850. Accordingly, plain string 850 is deemed virus-infected.

Because of the large number of byte strings too look for, it is preferable to scan for all or most of these byte strings at the same time, in parallel, using a Bloom filter or TCAM (ternary content-addressable memory), for example. Even then, the pattern matching engine 311 preferably remains stream-based by sequentially scanning received plain streams, from the first received byte to the last received byte of the stream, once and in a forward (i.e., toward later received bytes) direction, recording matched strings and locations of those matched strings as opposed to historical content. This is preferable to traditional file based solutions that need to randomly access different portions of the plain stream.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of detecting a computer virus in a data stream in a computer network, the method comprising:

receiving a data stream in a protocol parser, the data stream carrying a file in an application layer, the protocol parser extracting compressed portions of the file from the application layer;

streaming the compressed portions of the file to a decompressor as the protocol parser is still extracting other compressed portions of the file from the application layer, the decompressor decompressing the compressed portions of the file to generate plain portions of the file without receiving the entirety of the file from the protocol parser; and streaming the plain portions of the file to a pattern matching engine as the decompressor is still decompressing the other compressed portions of the file, the pattern matching engine sequentially scanning the plain portions of the file for computer viruses without receiving an entirety of the file;

wherein the pattern matching engine scans the plain portions of the file for computer viruses by comparing the plain portions of the file against virus signatures, each virus signature comprising: a first signature segment and a second signature segment, each of the first and second signature segments comprising a byte string indicative of a computer virus; and a distance information specifying a distance between the first and second signature segments in the plain portions of the file.

2. The method of claim 1 wherein the pattern matching engine sequentially scans the plain portions of the file in a single direction from a first received unit of the plain portions of the file towards a last received unit of the plain portions of the file.

3. The method of claim 2 wherein the first received unit comprises a byte of data.

4. The method of claim 1 wherein the protocol parser comprises an HTTP parser.

5. The method of claim 1 wherein the protocol parser and the decompressor each comprises a state machine.

6. The method of claim 1 further comprising an offset information indicating an offset to the first signature segment in the plain portions of the file.

7. A computer having memory and a processor for executing computer-readable program code in the memory, the memory comprising:

a stream-based protocol parser configured to extract a file stream from a data stream in a computer network, the file stream carrying a file being transferred from a first computer to a second computer over the computer network;

a stream-based decompressor configured to receive the file stream from the protocol parser and to start decompressing the file to generate a plain stream without receiving an entirety of the file; and a stream-based pattern matching engine configured to receive the plain stream and to start scanning the file for computer viruses without receiving an entirety of the file, the stream-based pattern matching engine being configured to scan the plain stream for occurrence of computer viruses using a plurality of virus signatures;

wherein each of the plurality of virus signatures comprises a first signature segment and a second signature segment, each of the first and second signature segments comprising a binary string indicative of a computer virus; and a distance information specifying a distance between the first and second signature segments in the plain stream.

8. The computer of claim 7 wherein the memory further comprises:

a pattern file comprising the plurality of virus signatures.

9. The computer of claim 7 wherein the stream-based protocol parser comprises an HTTP parser.

10. The computer of claim 7 wherein the stream-based protocol parser and the stream-based decompressor each comprises a state machine.

\* \* \* \* \*